Figure 1:
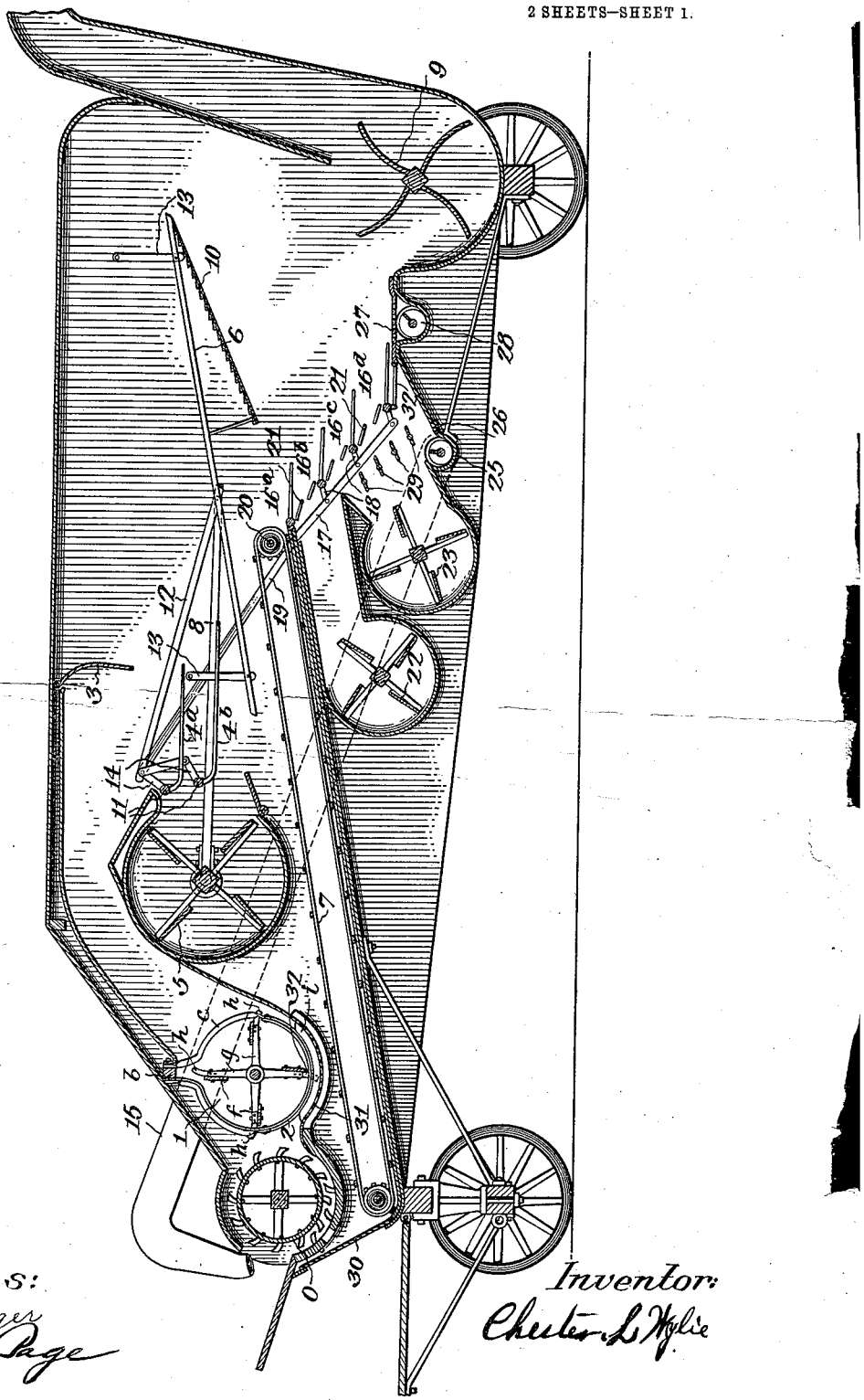

C. L. WYLIE.
GRAIN SEPARATOR.
APPLICATION FILED MAY 6, 1909.

1,013,257.

Patented Jan. 2, 1912.

2 SHEETS—SHEET 1.

Witnesses:

Inventor:
Chester L. Wylie

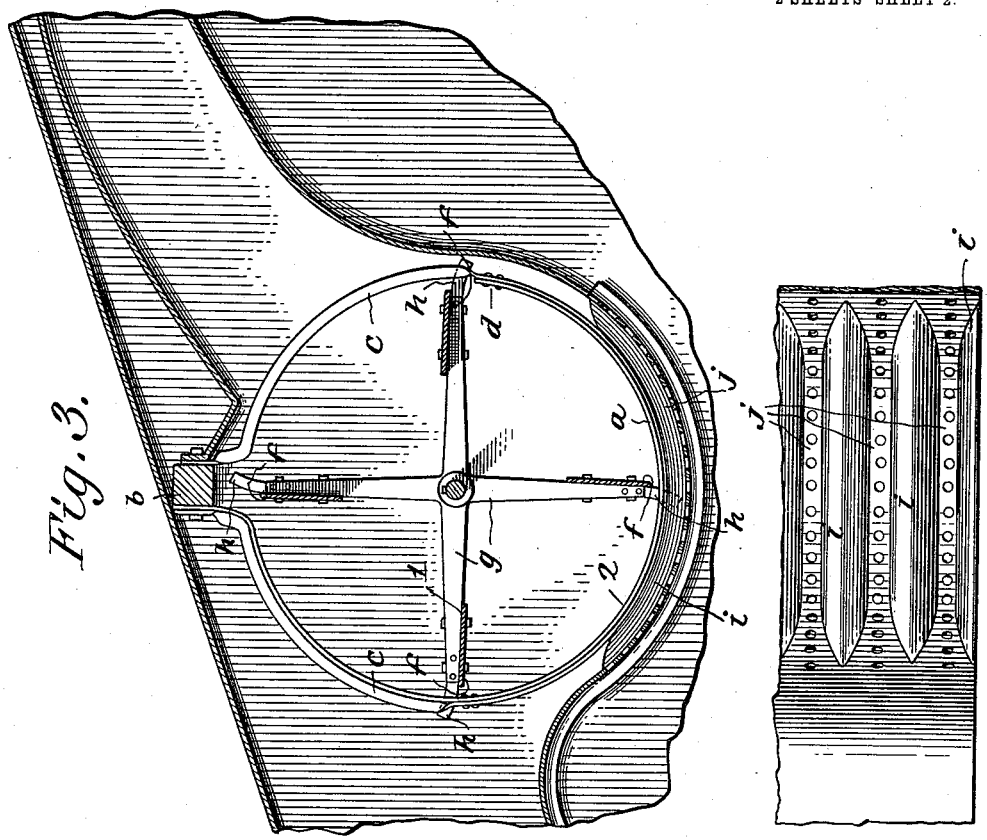
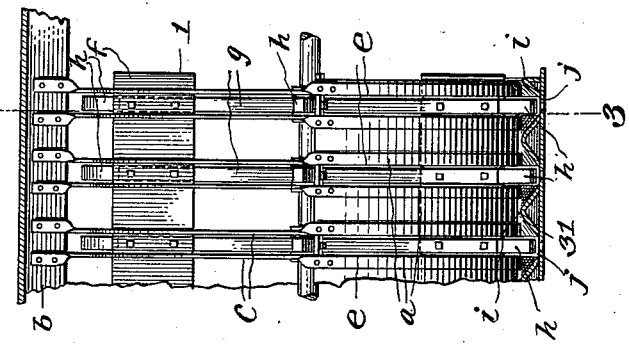

UNITED STATES PATENT OFFICE.

CHESTER L. WYLIE, OF VALLEY CITY, NORTH DAKOTA.

GRAIN-SEPARATOR.

1,013,257. Specification of Letters Patent. Patented Jan. 2, 1912.

Application filed May 6, 1909. Serial No. 494,295.

*To all whom it may concern:*

Be it known that I, CHESTER L. WYLIE, a citizen of the United States, residing at Valley City, in the county of Barnes and State of North Dakota, have invented a new and useful Improvement in Grain-Separators, of which the following is a specification.

My invention relates to threshing machines and grain separators and the objects of my improvement are first: to provide a windblast for the purpose of elevating the straw and unseparated grain as it comes from the threshing cylinder of a threshing machine and grain separator; second, to provide a windblast and sets of agitating separating fingers for the purpose of separating the grain from the straw; and third, to provide a corrugated, semi-open bottom grain pan for the purpose of allowing the separated grain to fall downward upon a grainrake. I attain these objects by the mechanism illustrated in the accompanying drawings, in which—

Figure I is a side view of the interior of the entire machine: Fig. II, Sheet 2, is a detailed rear view of the fan drum within which the combined fan and picker operates: Fig. III, Sheet 2, is an end view of the combined fan and picker: Fig. IV, Sheet 2, is a detailed top view of the corrugated, bottom grain pan.

Similar figures and letters refer to similar parts throughout the several views.

No. 0, is the threshing cylinder which beats the grain from the unthreshed straw. The combined fan and picker No. 1, placed at the rear of the threshing cylinder is operated at a high rate of speed. When the straw and unseparated grain leaves the threshing cylinder, it is caught by the pickers No. 32, on the combined fan and picker, and carried around and under the fan drum No. 2, until the windblast from combined fan and picker catches the straw and unseparated grain and elevates and drives it upward and over to checkboard No. 3, which causes the straw and unseparated grain to fall downward upon separating fingers No. 4$^a$ and No. 4$^b$. The row of separating fingers No. 4$^b$, is placed below row No. 4$^a$. Each of these rows of separating fingers extends across the entire width of the threshing machine and work with an agitating movement upward and downward by means of eccentric rod No. 8. The straw is then caught by a windblast from fan No. 5, which together with the agitating motion of the separating fingers No. 4$^a$ and No. 4$^b$, drives the straw in a spray to the strawrack No. 6. All unseparated grain (if there be any) will fall down to the grain rake No. 7. The strawrack No. 6, is agitated by means of an eccentric rod No. 8, and serves as another separating means and drives the straw over to the windstacker No. 9, and all grain that may be shaken from the straw rack No. 6, will fall downward into return table No. 10, and be returned to the cleaning means. Rockshafts No. 11, receive their motion from pitman bar No. 12, connected to each side of straw rack No. 6. The straw rack hangs upon links No. 13, which allow it to swing backward and forward. The arms, No. 14, are attached to rockshafts No. 11, and are connected to the upper end of pitman No. 12, by which the two sets of separating fingers receive their motion upward and downward. This causes the straw to fall loosely down through the separating fingers in a spray where the windblast from fan No. 5, separates the straw and chaff from the grain and gives me an unlimited separating capacity in my improved windblast threshing machine and grain separator.

For the purpose of separating the grain from the chaff, I employ four sets of combboards, Nos. 16$^a$, 16$^b$, 16$^c$, and 16$^d$, provided with long teeth through which the grain falls as it comes from the grain rake No. 7. Combboard No. 16$^d$ is adjustable so that it may be opened or closed to meet the requirements of different kinds of grain. These combboards have an agitating movement upward and downward, and receive their motion from connecting arm No. 17, attached to shaft arms No. 18, which are connected to the combboard shafts. Connecting arm No. 17, is operated by long pitman No. 19, or it can get its motion from the grain rake shaft No. 20, by means of an eccentric. Under each combboard is a sheet iron shelf No. 21, set at an angle for the purpose of directing the grain forward as it falls so as to allow the grain to fall upon the next lower combboard. For cleaning purposes, I employ an overblast fan No. 22, which blows off the heavy part of the chaff as the grain falls from the grain rake No. 7, and an underblast fan No. 23, which may be called a recleaner. As the grain leaves the lower combboard, it falls upon a screen No. 24.

The grain passes over to the grain auger No. 25, while the foul seeds fall through a small opening No. 26, in the bottom of the grain chute. To carry the chaff over to the windstacker, I employ a wooden chaffer No. 27, which is attached to the lower combboard shaft by means of a small pitman No. 32, which is attached to an ear on the shaft. All grain that is not threshed falls through chaffer No. 27, to conveyer No. 28, which carries said unthreshed grain to an elevator No. 15, at one side of the threshing machine, which returns it to the threshing cylinder. The windboards No. 29, are used to regulate the wind on the two lower sets of combboards. No. 30, is a removable board which directs the threshed grain as it falls from the threshing cylinder, into the grain rake No. 7, and being removable, allows easy access to grain rake No. 7, for repair work. Grain rake No. 7, consists of two chain belts to which are attached cross slats in a suitable manner and is for the purpose of elevating the threshed grain to the combboards. It will be seen that by the combination of the combboards and grain screen or grain chute, I have eliminated the use of shoe or sieves, and also, that with fans No. 1, and No. 5, combined with fans No. 22, and No. 23, I have a complete windblast threshing machine and grain separator.

Fan drum No. 2, is made in sections $a$, and each section is made of heavy sheet iron attached at one end to crossbeam $b$, directly over the fan No. 1, and reaches three-quarters of the way around the combined fan and picker to a point $d$, where the windblast from combined fan and picker catches the straw. Heavy strips of band iron $c$, are riveted to each edge of the said fan drum sections and run the entire circumference of the fan. These band iron strips are fastened to the crossbeam $b$, and close to the point $d$, are each given a one-half twist by which the edges of the band iron strips are presented to the windblast from the combined fan and picker No. 1, to give the least resistance to the said windblast, and being close to the pickers of the fan as they revolve, clean the straw from the pickers. The open spaces $e$, between each section of the fan drum allow the pickers of the combined fan and picker to reach through and down to the bottom of the grain pan No. 31. The fan wings $f$, are firmly bolted to fan arms $g$, and the pickers $h$, are riveted to the ends of the fan arms $g$.

The parallel elevations $i$, in the grain pan cause the grain and chaff to slide into the parallel grooves $j$, where the grain falls through holes in the bottom of the grain pan, while the chaff and straw are caught by the pickers on combined fan and picker and thrown upward to where the windblast from combined fan and picker catches the straw and chaff.

I am aware that prior to my invention, threshing machines and grain separators have been made which seek to elevate the straw by machinery for separating purposes.

I do not wish to confine myself to any one piece of machinery that may be used to elevate the straw and unseparated grain from the rear of the threshing cylinder by the use of a windblast as there may be many different forms of machinery placed at the rear of the threshing cylinder of a threshing machine and grain separator for the purpose of elevating the straw and unseparated grain as it comes from the threshing cylinder.

I claim as my invention:

In a threshing machine and grain separator, the combination with threshing means a wind conduit along which the straw is blown and means for blowing the straw therealong, of rocking separating fingers disposed so that they will receive the straw from the wind conduit, a fan adapted to direct a blast through the said fingers, means for separating the grain from the chaff, rocking comb boards disposed so as to receive the chaff after passing from the fingers, and another fan adapted to deliver a blast between the comb boards.

CHESTER L. WYLIE.

Witnesses:
 JAMES P. PAGE,
 SEYMOUR GRANGER.